(12) United States Patent
Burgess

(10) Patent No.: US 6,923,470 B1
(45) Date of Patent: Aug. 2, 2005

(54) VEHICLE AIRBAG ARRESTOR

(75) Inventor: Robert D. Burgess, 30609 Indigo, Roseville, MI (US) 48066

(73) Assignee: Robert D. Burgess, Roseville, MI (US)

( * ) Notice: Subject to any disclaimer, the term of this patent is extended or adjusted under 35 U.S.C. 154(b) by 0 days.

(21) Appl. No.: 10/410,086

(22) Filed: Apr. 9, 2003

Related U.S. Application Data

(63) Continuation-in-part of application No. 09/982,330, filed on Oct. 18, 2001.

(60) Provisional application No. 60/241,313, filed on Oct. 18, 2000.

(51) Int. Cl.$^7$ .............................................. B60R 21/02
(52) U.S. Cl. ...................... 280/727; 280/731; 74/558.5
(58) Field of Search ............................... 280/727, 750; 74/558.5, 558, 552

(56) References Cited

U.S. PATENT DOCUMENTS

| | | | |
|---|---|---|---|
| 1,997,738 A * | 4/1935 | Maxedon et al. ........... | 74/558.5 |
| 3,437,350 A | 4/1969 | Clark ......................... | 280/150 |
| 3,618,979 A | 11/1971 | Gulette ....................... | 280/150 |
| 3,960,386 A | 6/1976 | Wallsten ..................... | 280/731 |
| 3,970,328 A | 7/1976 | Wallsten ..................... | 280/731 |
| 3,982,602 A | 9/1976 | Gorman ....................... | 180/114 |
| 5,131,290 A | 7/1992 | Atkinson ................... | 74/558.5 |
| 5,174,599 A | 12/1992 | Hull et al. ................. | 280/731 |
| 5,277,440 A | 1/1994 | Jackson, Jr. ................ | 280/727 |
| 5,438,734 A | 8/1995 | Anderson .................... | 24/170 |
| 5,507,205 A * | 4/1996 | Ruimi ......................... | 74/558 |
| 5,711,032 A | 1/1998 | Carpenter ..................... | 2/158 |
| 5,775,722 A | 7/1998 | Moore et al. ................ | 286/727 |
| 5,832,569 A | 11/1998 | Berg ........................... | 24/170 |
| 5,997,028 A | 12/1999 | Lenz .......................... | 280/727 |
| 6,203,055 B1 | 3/2001 | Mouws ....................... | 280/727 |
| 6,322,099 B1 | 11/2001 | Keeble ....................... | 280/727 |
| 6,471,241 B1 | 10/2002 | Toland ........................ | 280/731 |
| 2002/0194946 A1 * | 12/2002 | Jackson ....................... | 74/558 |

OTHER PUBLICATIONS

"Bagbuster" Product News, Rescue Tools, Inc, Oct. 25, 2000.

* cited by examiner

Primary Examiner—Ruth Ilan
(74) Attorney, Agent, or Firm—Young & Basile, P.C.

(57) ABSTRACT

An airbag arrestor mountable about a vehicle steering column carrying a steering wheel and a airbag module is non-axially movable with respect to the vehicle steering wheel and steering column during airbag inflation by containing and redirecting airbag inflation gasses oppositely from the steering wheel through apertures in the sidewall of the airbag arrestor enclosure secured about the steering column. The airbag arrestor includes a flexible, ballistic grade material enclosure having a sidewall extending between an open end and an opposed closed end. An attachment in the form of a strap constructed of a ballistic grade material is tightenable about one end of the sidewall of the enclosure adjacent the open end to non-axially movably secure the enclosure about the vehicle steering column.

15 Claims, 4 Drawing Sheets

VEHICLE AIRBAG ARRESTOR

CROSS-REFERENCE TO CO-PENDING APPLICATION

This application is a continuation-in-part of co-pending U.S. patent application Ser. No. 09/982,330 filed Oct. 18, 2001 which claims the benefit of provisional Application Ser. No. 60/241,313, filed Oct. 18, 2000 in the name of Robert D. Burgess, both entitled "VEHICLE AIRBAG ARRESTOR", the contents of both of which are incorporated herein in their entirety.

BACKGROUND

Today's vehicles are provided with passenger restraint devices, such as inflatable airbags, which are mounted in various locations within the vehicle, including within the steering wheel.

Sensors mounted at appropriate locations within the vehicle provide a signal to an inflation device when a predetermined amount of force contact is made with another object. The inflation device generates or supplies a quantity of gas to inflate the airbag and thereby cushion the forward movement of the driver of the vehicle and resulting from a front collision.

While airbags have proven to be effective in saving people's lives by minimizing injuries during a front vehicle collision, it has been found that in certain circumstances the airbag inflation device may be armed, but may not have gone off. This armed stated lasts for a predetermined period of time, such as two minutes, before the inflation device resets itself to an inactive state.

Frequently, in serious collisions, the driver 13 trapped within the surrounding vehicle body and literally, the vehicle body must be cut away from the driver in order to remove the driver from the vehicle. The so-called "jaws of life" are used in such a situation. A further complication in vehicle collisions is that an emergency person, such as a fireman, E.M.S., etc., may be required to attend to a driver trapped within a vehicle until the vehicle sheet metal is cut away or removed to enable the driver to be removed from the vehicle. Such emergency persons may be required to give resuscitation, C.P.R., or other medical assistance until the driver can be removed from the vehicle and attended to in a more adequate facility, such as a hospital, E.M.S. vehicle, etc.

In such a circumstance, the emergency person's head can be situated between the airbag in the vehicle steering wheel and the driver's head. This places the emergency person's head in a precarious position, particularly where the airbag inflation sensor may have been activated, but, for some reason, the inflation device has not yet activated to inflate the airbag.

In the event that the airbag inflates under its considerable force and speed when the emergency person's head is between the airbag and the driver's head, the emergency person's head will be forced into the driver's head, thereby creating the potential for serious injury to the emergency person as well as to the driver.

One attempt to address this problem is an emergency service device in the form of a circular steel plate with two large hooks protruding from an upper portion. The rear side of the steel plate is fitted with a series of triangle deflators which engage and rip open the airbag. The main body of the steel plate is slotted to accommodate the adjustable placement of a secondary inner body in the form of a rectangular steel plate with two hooks protruding from a lower portion. When assembled together, the upper and lower portions of the two steel plates can be adjusted to accommodate different steering wheel dimensions. A tensioning knob extends through the circular plate and allows adjustment of the lower hooks on the inner plate. Once the hooks are securely in place, the tensioning knob is tightened. A dust cover is fastened around the steering wheel and the plate/hook assembly and tightened in place about the steering column by a strapping band. Ventilation openings are provided between the inner surface of the dust cover and the steering column when the dust cover strap is tightened.

However, this prior attempt at an airbag arrestor addresses the aforementioned problems with a complicated, multi-part device which requires several attachment steps and a tightening operation to secure the main device in place, and an additional installation step to add the dust cover. This takes time and can be a cumbersome task in the typically confined space existing in a crushed vehicle after a collision. At the same time, the dust cover in this device provides only a dust containment enclosure for the smoke and debris emitted by the airbag module during airbag inflation. The dust cover is not intended to suppress the entire airbag inflation as it is only provided as a dust and debris control enclosure.

Thus, it would be desirable to alleviate these potential problems. It would also be desirable to provide a device which contains the inflation of a vehicle airbag without significant expansion of the airbag. It would also be desirable to provide an airbag containment device which can be easily employed by an emergency person, preferably by one hand. It would also be desirable to provide an airbag containment device which can be repeatedly used in many emergency situations.

SUMMARY

The present invention is an vehicle airbag arrestor which uniquely arrests and contains the inflation pressures in the vehicle airbag when the airbag arrestor is mounted about a vehicle steering wheel and steering column.

In one aspect, the airbag arrestor of the present invention includes a flexible, high strength enclosure having an open end. An attachment means is mountable about the enclosure to non-axially movably mount the enclosure about a vehicle steering column and a vehicle steering wheel containing an airbag module. The high strength, yet flexible nature of the material employed to form the airbag arrestor enclosure enables the enclosure to be easily mounted about a vehicle steering wheel and airbag module and a portion of the vehicle steering column and be securely fixed in place by the attachment means; while at the same time having sufficient strength to resist any substantial axial movement of the end of the enclosure with respect to the vehicle steering column and steering wheel so as to contain and redirect the explosive forces generated during airbag inflation.

The attachment means is, in one aspect, in the form of a strap or cord which is carried on the enclosure or is attachable to the enclosure. A connector can be mounted on the strap to enable a free end of the strap to be tightened about the enclosure to conform a sidewall of the enclosure adjacent to the open end tightly about the vehicle steering column while still allowing ventilation through the open end of the enclosure.

In another aspect, the connector includes at least one and possibly two biased latched members mounted in a body through which both ends of the strap or cord extend. Either free end of the cord can be drawn in one direction away from the body to tighten the cord about the enclosure. However, the latch members prevent reverse loosening movement of the strap thereby maintaining the strap in the tightened position until the associated latch member is moved to an unlatched position. In this position, one end of the strap or cord can be pulled through the latch thereby loosening the strap for removal of the enclosure from the steering column.

In another aspect of the invention, the airbag arrestor includes an enclosure having a closed end wall, an opposed open end and a sidewall. The enclosure defines an interior cavity between the end wall and the open end to be mountable over a vehicle steering wheel. An attachment member is mountable about the open end of the enclosure to substantially, non-axially, movably mount the enclosure over a vehicle steering wheel.

The airbag arrestor also includes at least one or more apertures formed in the sidewall of the enclosure.

In another aspect, the sidewall of the enclosure includes a plurality of flaps extending from the end wall to an opposed free end, each flap having opposed side edges. At least a portion of the side edges of two adjacent flaps are spaced apart to define the aperture therebetween.

In another aspect, the end wall of the enclosure includes shape support means, coupled to the end wall, for maintaining the shape of the end wall.

The support means includes a shape support member coupled to the end wall. The end wall further includes first and second spaced panels, the shape support means disposed between the spaced panels.

In another aspect, reinforcement means are coupled to the end wall for reinforcing the end wall.

The reinforcing means may include at least one strap coupled to the end wall. Alternately, the reinforcement means is a plurality of straps coupled to the end wall. At least two of the reinforcement straps may have overlapped portions.

In another aspect, the attachment member includes a strap disposed about the open end of the sidewall of the enclosure, and a connector, coupled to the strap for receiving a free end of the strap to releasible tighten the strap and the open end of the enclosure to a reduced diameter.

In another aspect, the strap is carried on the enclosure.

In another aspect, the sidewall includes a plurality of spaced straps extending from one end coupled to the end wall to opposed free end. Carrying means are formed on the free end of each flap for receiving the strap therethrough. The carrying means may be a pocket carried on the free end of each flap.

The airbag arrestor of the present invention overcomes certain deficiencies found in prior art airbag arrestors in that the present airbag arrestor may be easily and quickly installed and secured in a fixed, substantially non-axially movable position about a vehicle steering column and steering wheel without requiring an excessive number of mounting steps. The present airbag arrestor may be secured in place about the vehicle steering column by an essentially one hand operation which can be crucial in emergency conditions.

The present airbag arrestor uniquely confines and redirects the explosive gasses generated during airbag inflation away from the outer end of the airbag arrestor enclosure. This provides increased safety to emergency personnel which may have his or her head positioned between the airbag in the vehicle steering wheel and the driver while giving emergency care or attempting to remove the driver from the vehicle.

BRIEF DESCRIPTION OF THE DRAWINGS

The various features, advantages and other uses of the present invention will become more apparent by referring to the following detailed description and drawing in which.

DETAILED DESCRIPTION

Figure 1:
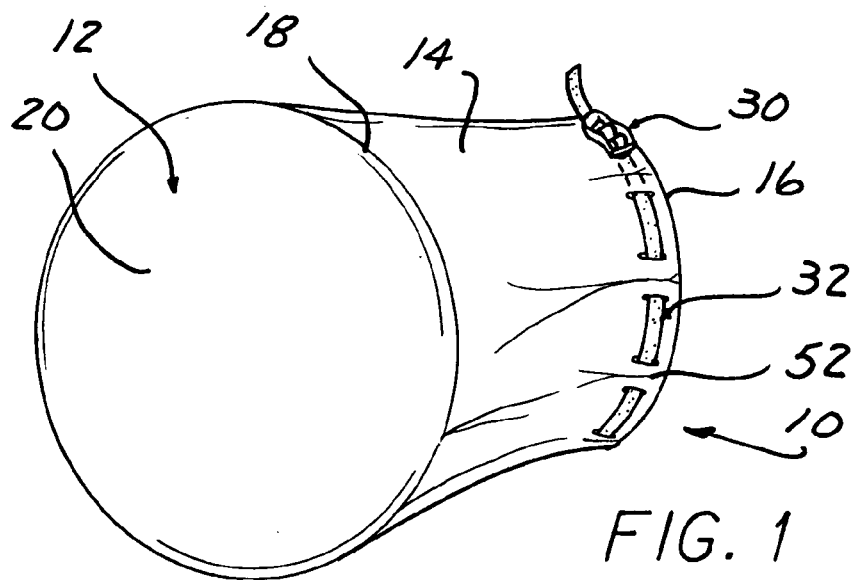
FIG. 1 is a perspective view of an airbag arrestor according to the present invention.
Figure 2:
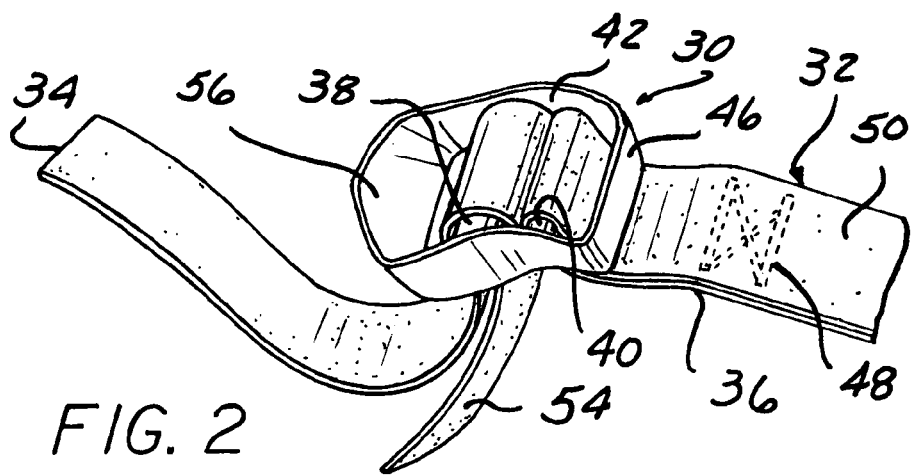
FIG. 2 is an enlarged, perspective view of the latch device mounted on one end of the airbag arrestor shown in FIG. 1.
Figure 3:
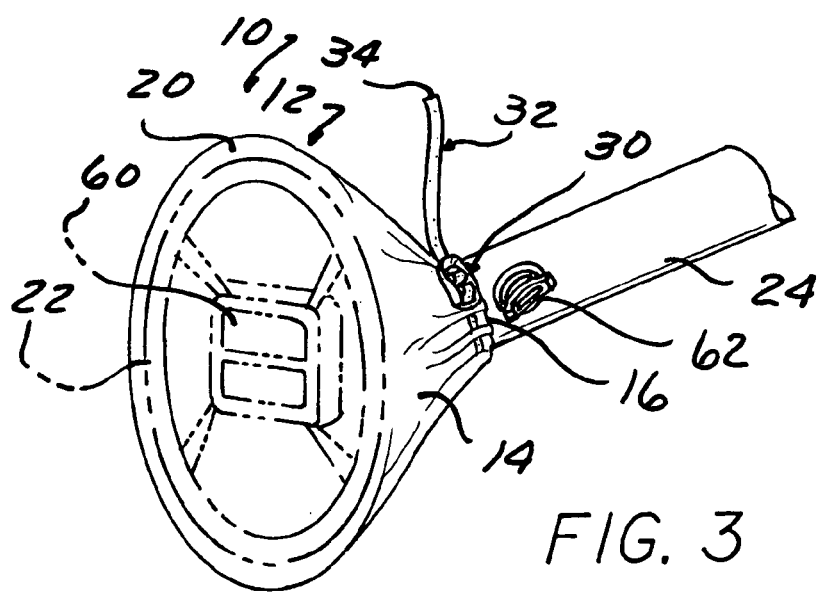
FIG. 3 is a perspective view showing the airbag arrestor of FIGS. 1 and 2 mounted in a use position on a vehicle steering column and steering wheel.

Referring now to the drawing, and to FIGS. 1–3 in particular, there is depicted a first aspect of an airbag arrestor 10 according to the present invention. The airbag arrestor 10 is in the form of an enclosure 12 formed of a strong, but flexible material. The enclosure 12 has a generally cylindrical portion 14 extending from a first end 16 to an opposed second end 18. A generally flat end wall 20 is formed at the second end 18 of the sidewall 14. The enclosure 12 is preferably formed of a one-piece construction, although the sidewall 14 and the end wall 20 may be formed as separate panels or members which are securely joined together, such as by stitching, etc.

The first end 16 defines an interior opening end having a diameter sufficient to enable the first end 16 to be slid over a vehicle steering wheel 22 shown in phantom in FIG. 3.

Although the enclosure 12 preferably has the shape shown in FIG. 1, it will be understood that the enclosure 12 may take other shapes, such as a generally spherical shape extending from the first end 16.

In general, the enclosure 12 is formed with a steering wheel encompassing portion formed adjacent to the end wall 20 and a steering column attachment portion adjacent to the first end 16.

The enclosure 12 has a suitable length to facilitate easy mounting over a vehicle steering wheel 22 while enabling the first end 16 to be cinched down or tightened to a small diameter to hold the enclosure 12 securely and substantially non-movably on a vehicle steering column 24 to which the steering wheel 22 is mounted. The sidewall 14 may have a length sufficient to dispose the first end 16 over the steering column 24 axially over any elongated levers, such as a transmission shift lever, windshield wiper control lever, etc., which are typically mounted on vehicle steering columns to control various vehicle operating circuits and devices. Alternately, the sidewall 14 may have an elongated length sufficient to enable the first end 16 to be disposed entirely over all such levers and further along the length of the steering column 24 while enabling the first end 16 to be cinched down to a small diameter substantially in tight engagement with the outer diameter of the steering column 24.

The enclosure 12 is preferably formed of a lightweight, flexible, yet strong material. One preferred material is ballistic material used in soft body armor. KEVLAR is a typical aramide fiber employed in such soft body armor. While the use of ballistic material is preferred, it will be understood that the enclosure 12 may be formed of other strong, but flexible materials having sufficient strength to not expand to any significant degree despite the full force inflation of an airbag within the interior of the enclosure 12 as described hereafter.

Attachment means 30 are mounted on the enclosure 12, generally adjacent the first end 16 as shown in FIG. 1 and in greater detail in FIG. 2. The attachment means 30 functions to enable the first end 16 of the enclosure 12 to be expanded to its full open diameter; yet to be able to be cinched or tightly secured in a significantly smaller diameter in secure, substantially non-movable engagement about the vehicle steering column 24. Ideally, the attachment means 30 provide such tightening engagement of the first end 16 of the enclosure 12 about a vehicle steering column 24 through a one-handed operation as described hereafter.

One aspect of the attachment means 30 is shown in FIGS. 1 and 2. The attachment means 30 include an elongated strap 32 preferably formed of a strong, lightweight, flexible material, such as ballistic material, i.e., ballistic grade polyamide, such as NYLON, etc. The strap 32 has a first end 34 and an opposed second end 36. Portions of the strap 32 are wound about shafts or legs 38 and 40, respectively, mounted in a connector 42.

As shown in FIG. 2, the second end 36 of the strap 32 is wound about the shaft 40 at one end of the connector 42 after the portion of the strap 32 adjacent to the second end 34 is passed underneath one end leg 46 of the connector 42, around the shaft 40 and then into engagement with an adjoining portion of the strap 32. Securement means, such as stitching 48, are employed to join the second end 36 of the strap 32 to an adjoining portion of the strap 32.

The upper portion 50 of the strap 32 extends from the point of attachment to the second end is slidably mounted about the first end 16 of the enclosure 12, such as by passing the strap 32 through loops or other securement means 52 formed on the enclosure 12. Thus, the portion 50 of the strap 32 extends completely around the periphery of the first end 16 of the enclosure 12 to a portion 54 shown in FIG. 2 which loops around the first shaft 38 in the connector 42, passes under an opposite end leg 56, and terminates in the first end 34.

In this arrangement, the first end 34 of the strap 32 is movable away from the connector 30 to tighten the strap 32 and the first end 16 of the enclosure 12 in a smaller diameter in tight engagement with the exterior of the vehicle steering column 24 as shown in FIG. 3. The end portion of the strap 32 extending from the first end 34 is held underneath the end leg 56 of the connector 42 to tightly retain the strap 34 in any tightened diameter. Upward movement on the leg 56 of the connector 30 will release the cinching force thereby enabling the strap 32 to be re-expanded to its normal, enlarged diameter.

Use of the airbag arrestor 10 will now be described in conjunction with FIG. 3. As shown in FIG. 3, an airbag 60 is mounted within the vehicle steering wheel 22 rotatably affixed to the vehicle steering column 24. Although not shown in FIG. 3, a conventional transmission shift lever, windshield wiper control lever, headlight control lever, etc., are normally mounted on the vehicle steering columns. However, an ignition key switch 62 is depicted by way of example only.

First, the first end 16 of the enclosure 12 will be expanded to its fullest diameter and the open first end 16 will be slid over the steering wheel 22. The enclosure 12 will be pulled over the steering wheel 22 until the end wall 20 is disposed in contact with or in close proximity to the steering wheel 22. The attachment means or strap 30 will then be grasped at one end, such as the free first end 34, and pulled to tightly compress the first end 16 of the enclosure 12 into secure engagement with the exterior surface of the vehicle steering column 24.

In this position, the airbag arrestor 10 of the present invention is securely mounted on the steering column 24 so as not to exhibit any substantial axial movement away from the steering wheel 22 in a direction toward the vehicle driver. However, due to the flexible nature of the side wall 14 and end wall 20 of the enclosure 12, some expansion in overall size may occur; but not to any significant amount. The enclosure 12 will contain any inflation of the airbag 60. The gases used to inflate the airbag 60 will escape through the first end 16 of the enclosure 12.

After the airbag arrestor 10 is no longer needed, the connector 32 is released and the strap 30 expanded to its full diameter enabling the enclosure 12 to be removed from the vehicle steering wheel 22.

Figure 4:
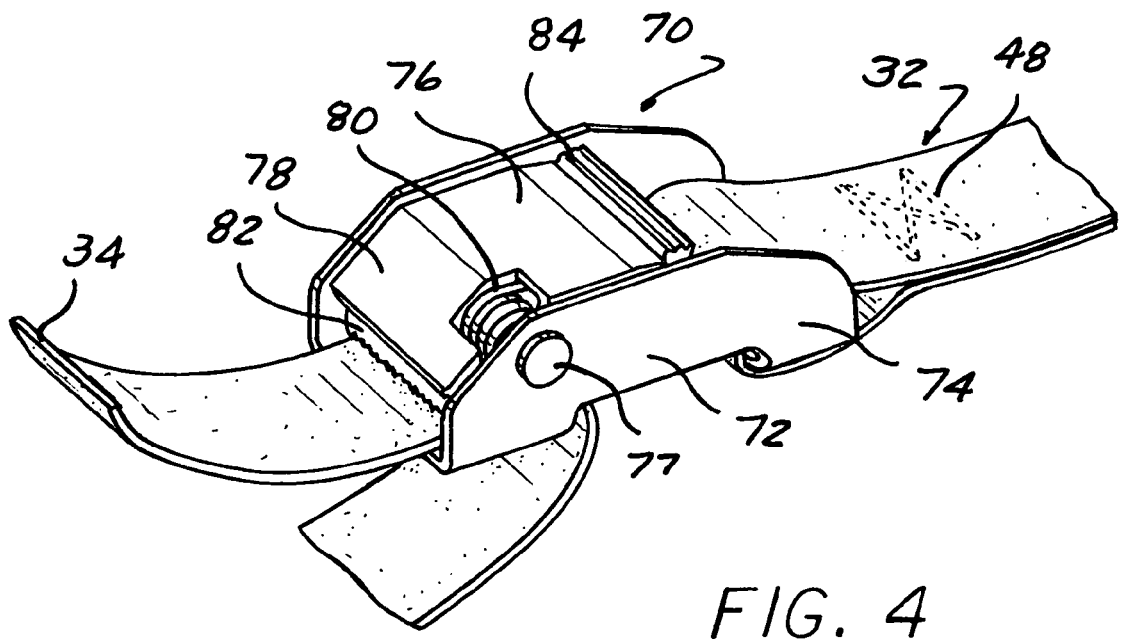
FIG. 4 is a perspective view of an alternate latch which may be employed in the airbag arrestor of the present invention.

FIG. 4 depicts yet another aspect of a connector 70 that may be used in the airbag arrestor 10 of the present invention. The connector 70 includes a latch body 72 having a first end 74 about which the second end of the strap 32 is wound and secured to itself by the stitching 48 as described above. A pivotal latch member 76 is mounted about a shaft 78 at the other end of the body 72. The latch member 76 is biased downwardly at a first end 78 by means of a biasing means, such as a coil spring 80, mounted above the shaft 78 and acting on the opposed end of the latch member 76.

The first end 78 of the latch member 76 is provided with a secure gripping surface 82, such as knurling, serrated teeth, etc., which dig into and engage the strap 72 looped around one end of the body 72.

A hand release surface 84 is provided at the opposite end of the latch member 76 for pivoting the latch member 76 in the direction to disengage the gripping surface 82 from the strap 32 thereby enabling the strap 32 to be retracted with respect to the body 72 so as to enable the first end 16 of the enclosure 12 to be expanded to its fullest diameter.

At the same time, the first end 74 and the strap 32 may be pulled under force through the latch member 76. The gripping surface 82 prevents reverse movement of the strap 32 unless the hand release surface 84 is engaged to pivot the gripping surface 82 away from the strap 32.

Figure 5:
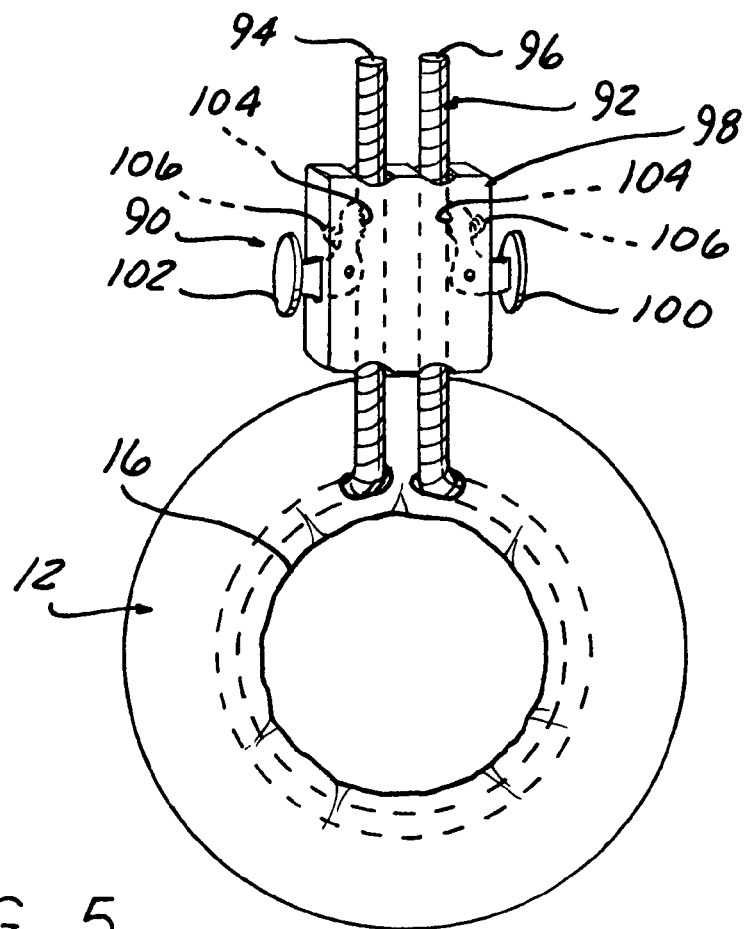
FIG. 5 is a perspective view of yet another latch which may be employed with the airbag arrestor of the present invention.
Figure 6:
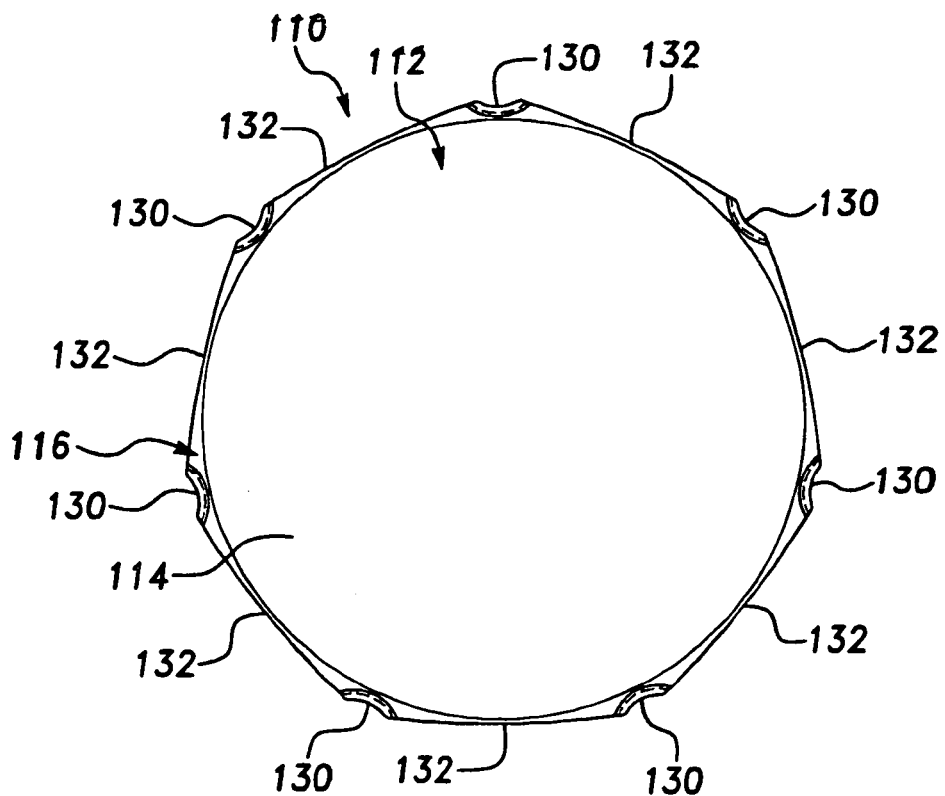
FIG. 6 is a front elevational view of another aspect of an airbag arrestor according to the present invention.

Another aspect of the latch or connector member according to the present invention is shown in FIG. 5. In this aspect, a strap 92 is in the form of a cord, formed of ballistic grade NYLON, for example, having first and second free ends 94 and 96, respectively. Both ends of the strap 92 extend through bores in a latch body 98. From the latch body 98, the two ends of the cord 92 extend through a folded-over portion on the first end 16 of the enclosure 12.

The latch body 98 carries two identical latch members 100 and 102, each of which is provided with a gripping surface 104 at one end. The gripping surfaces 104 are disposed in the bores in the latch body 98. Biasing springs 106 carried on the latch body 98 bias the latch members 100 and 102 into a position in which the gripping surfaces 104 fixedly engage the two portions of the cords 92 to prevent reverse movement of the two portions of the cords through the body 98. However, downward pivotal movement of one end of either latch member 100 and 102 will disengage the gripping surface 104 from the respective portion of the cord 92 thereby enabling the respective portion of the cord 92 to be pulled through the latch body 98 to enable the diameter of the first end 16 of the enclosure 12 to be expanded.

Reverse directional pulling of either end 94, 96 of the cord 92 away from the latch body 98 reduces the length of the cord 92 within the first end 16 of the enclosure 12 thereby reducing the diameter of the first end 16 to enable the first end 16 to conform in snug engagement with the vehicle steering column.

Referring now to FIGS. 6–9, there is depicted another aspect of an air bag arrestor 110 according to the present invention. In this aspect, the airbag arrestor 10 also includes an enclosure 112 formed of a lightweight, flexible, yet strong material. One preferred material is ballistic material used in soft body armor. KEVLAR is a typical aramide fiber employed in such armor. Other strong, but flexible materials having sufficient strength so as not to expand to any significant degree despite the full force inflation of an airbag within the interior of the enclosure 112 can also be used to form the enclosure 112.

The enclosure 112 includes an end wall 114, a sidewall, generally denoted by reference number 116, and an end 118 opposed from the end wall 114.

Figure 9:
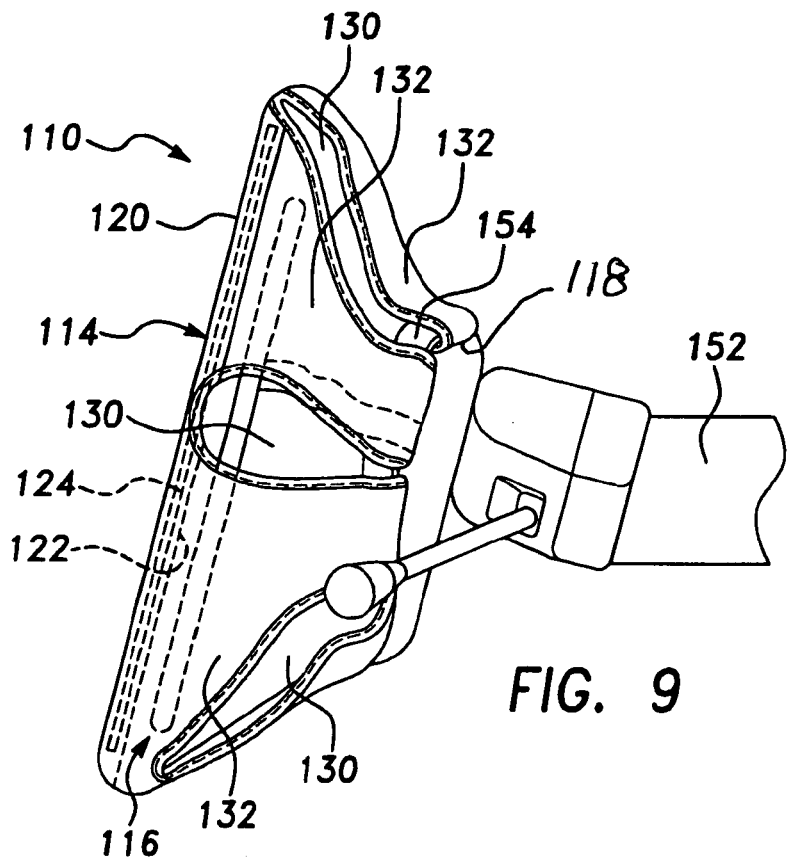
FIG. 9 is a side elevational view showing the airbag arrestor of FIGS. 6–8 mounted on the vehicle steering column.

The end wall 114 generally is formed of at least one substantially circular shaped fabric panel and, possibly, two spaced panels joined at peripheral edges to define an interior cavity. For example, as shown in FIG. 9, the end wall 114 may be formed of a first end panel 120, and an opposed end panel 122, both joined together about their peripheral edges by stitching or integral formation. The spaced end panels 120 and 122 define an interior cavity in which a shape support means 124 is disposed. The shape support means 124 retains the rather flexible end panels 120 and 122 in the desired generally circular shape consistent with the circular shape of a steering wheel adjacent which the end wall 114 is disposed in a mounted position shown, for example, in FIG. 9. The shape support 124 may be formed of a semiflexible, sponge rubber, cardboard, or other minimally flexible, semi-rigid materials.

Figure 8:
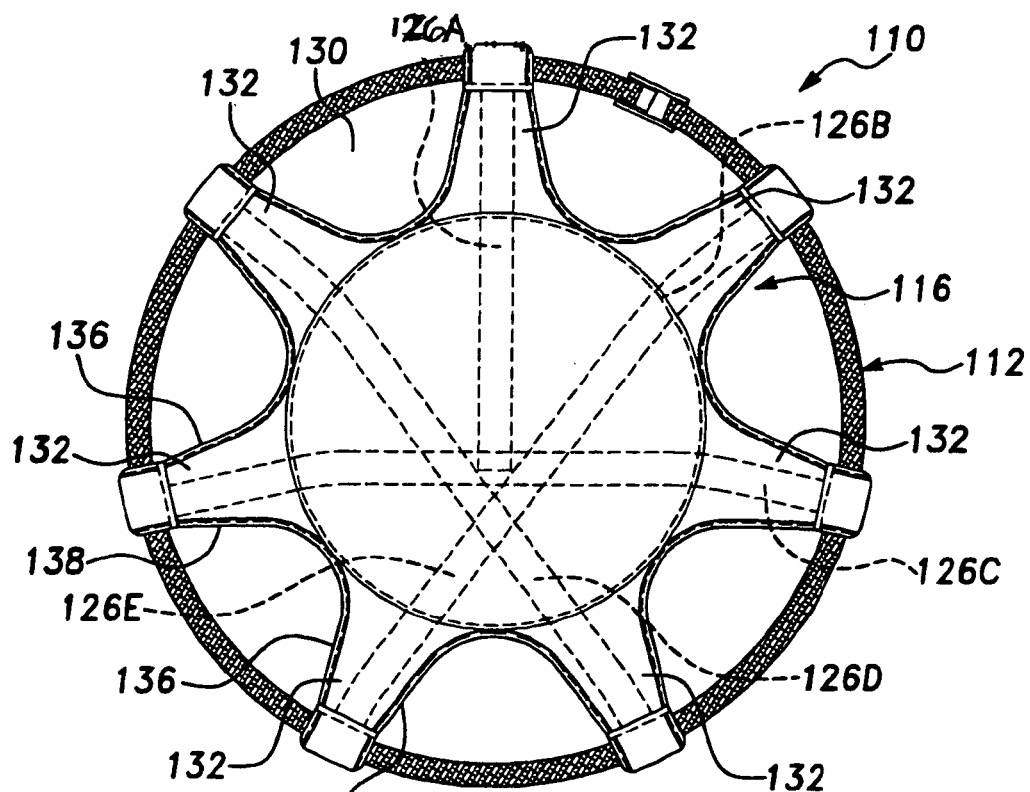
FIG. 8 is a rear elevational view of the airbag arrestor of FIGS. 6 and 7 with sidewall flaps deployed in an expanded, open position.

As shown in FIG. 8, in one aspect of the invention, reinforcement means in the form of one or more reinforcing strips denoted by reference numbers 126A, 126B, 126C, 126D are mounted on the inner surface of the end wall 114, such as to the inner surface of the end panel 122. The reinforcement straps 126A–126D are formed of a suitable high strength material, such as 500 pound polypropylene dropline, for example.

Each reinforcement strap 126A–126D has at least one end which extends from one side of the enclosure 112 to an opposite end. The opposite of one or more of the reinforcement straps, 126A–126D can extend to an opposed edge or terminate within the periphery of the end panel 122 as for the strap 126A shown in FIG. 8.

Also, additional strength may be provided by overlapping a portion of two or more reinforcement straps 126A–126D as also shown in FIG. 8.

The reinforcement straps 126A–126D may be fixedly mounted to the end panel 122 by means of adhesive or by stitching each reinforcement strap 126A–126D to one surface of the end panel 122, such as the surface of the end panel 122 facing away from the shape support member 124.

The sidewall 116, in this aspect of the invention, includes at least one and potentially a plurality of apertures each denoted by reference number 130. Although the one or more apertures 130 may be formed as individual apertures having a completely closed periphery surrounded by portions of the sidewall 116, in one aspect of the invention, the apertures 130 in the sidewall 116 are formed by plurality of flaps, each denoted by reference number 132. Each flap 132 is joined at one end to the end wall 114 and extends continuously to an opposed, inner, free movable end 134. Each flap 132 also includes opposed side edges 136 and 138 which generally taper in a planar or acuate manner from a larger width spacing at the end wall 114 to a smaller width or spacing at the inner end 134. The apertures 130 are formed between opposed side edges 136 and 138 of two adjacent flaps 132 and extend to the inner ends 134 of two adjacent flaps 132.

Figure 7:
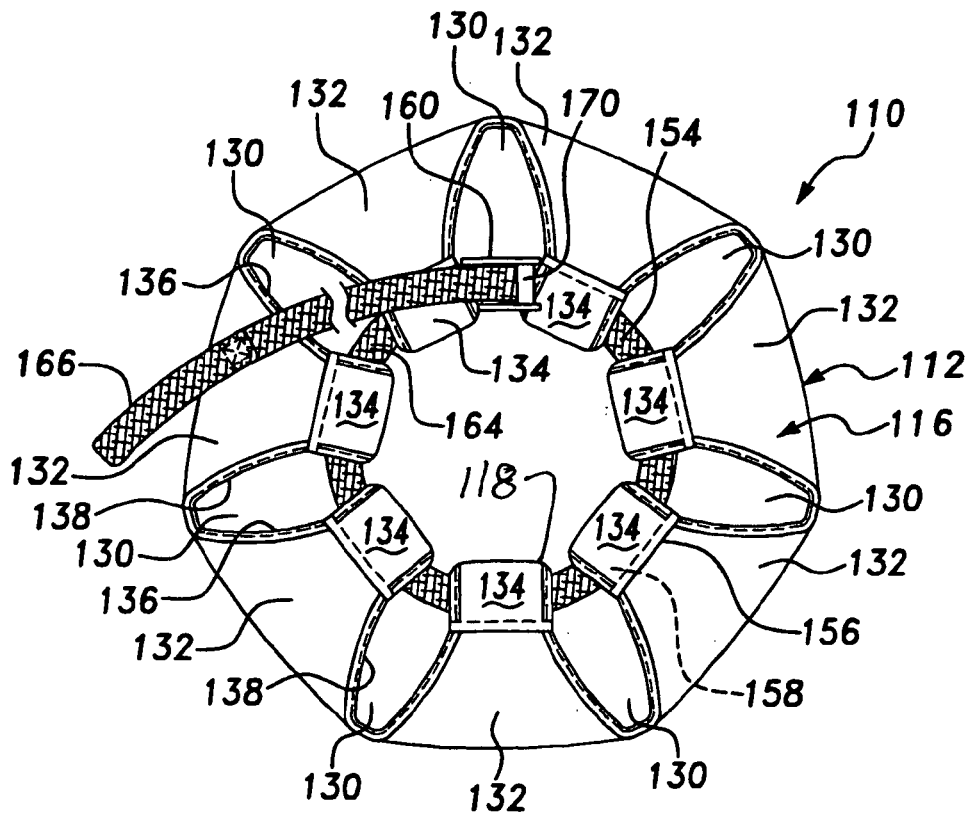
FIG. 7 is a rear elevational view of the airbag arrestor shown in FIG. 6 depicted in a use position.

As shown in FIGS. 7 and 9, the airbag arrestor 110 also includes an attachment means 150 which is securable to the enclosure 112 and functions to tightly confine the inner ends 134 of the flaps 132 about a vehicle column 152, shown by example in FIG. 9, with the end wall 114 disposed adjacent to the vehicle steering wheel. The attachment means 150 securely holds the airbag arrestor 110 over the steering wheel and prevents substantial expansion or movement during an inadvertent or unexpected inflation of the vehicle airbag mounted within the steering wheel.

As in the first aspect of the invention described above and shown in FIGS. 1–5, the attachment means 150 includes an elongated strap 154 formed of a strong, lightweight, flexible material, such as ballistic material, i.e., ballistic grade polyamide, such as NYLON, etc. The strap 154 may be formed of 3800 pound NYLON drop line.

The strap 154 may be mounted on or integrally carried as part of the airbag arrestor 10. As shown in FIGS. 7 and 9, the inner end 134 of each flap 132 is folded over and stitched to itself along stitch line 156 to form a hollow pocket. The strap 154 extends through the circumferentially spaced pockets 158 in the flaps 132 with the opposed ends of the strap 154 releasibly secured together by means of a connector or cinch 160.

The cinch 160 may be the same as the connector 42 described above and shown in FIG. 2. Typically, one end of the strap 154 is wound around a pin at one end of the cinch 160 and secured to itself along a stitch line. The opposite end 166 of the strap 154 is inserted through a pivotal lock member which can be pivoted to a position opening a slot between one end of the pivot member and an adjacent pin 170 on the cinch 160 to allow the end 166 of the strap 154 to be pulled therethrough thereby reducing the diameter of the inner ends 134 of the flaps 132 to securely conform the inner ends 134 of the flaps 132 tightly about a steering column as shown in FIG. 9. Release of the lock member closes the slot thereby tightly holding the end of the strap 166 in the tightened position and preventing substantial loosening of the strap. However, a subsequent pivotal movement of the lock member to a slot opening position will allow movement of the end 166 of the strap 154 relative to the cinch 160 to enable the entire airbag arrestor 110 to be removed from a vehicle steering column 152.

Referring now to FIG. 9, there is depicted a use or mounted position of the airbag arrestor 110. Prior to mounting over the steering wheel and steering column, the diameter of the inner ends 134 of the flaps 132 is expanded by movement of the free end of the strap 154 relative to the cinch 160. This enables the ends 134 of the flaps 132 to be expanded sufficiently to allow mounting of the free ends 134 of the flaps 132 over the steering wheel.

With the enclosure 112 in a position in which the end wall 114 is disposed adjacent to the steering wheel, the free end 166 of the strap 154 is pulled through the cinch 160 thereby reducing the diameter of the end 134 of the flaps 132 to bring the ends 134 of the flaps 132 into tight, non-movable engagement with a portion of the steering column 132.

In this position, as shown in FIG. 9, the apertures 130 are formed between the adjacent side edges 136 and 138 of two adjacent flaps 132. The apertures 130 function as an escape passage for inflation gases generated during inflation of an airbag. These ready gas egress passages enable the inflation gases of an inflating airbag to be quickly dissipated thereby minimizing the amount of force exerted on the end wall 114 which would tend to cause longitudinal movement of end wall 114 relative to the steering wheel.

Thus, there has been disclosed an airbag arrestor which uniquely arrests and contains the inflation pressures in a vehicle airbag when the airbag arrestor is mounted about a vehicle steering wheel and steering column. The airbag arrestor includes a flexible enclosure which can be easily mounted in a substantially non-expandable manner about a vehicle steering wheel. Attachment means in the form of a strap or cord is carried at an open end of the enclosure and extends through a connector to enable the first end of the enclosure to be cinched into a tightened, small diameter shape in secure engagement about a vehicle steering column, typically by a one-handed operation, to prevent substantial axial movement of the airbag arrestor enclosure along the vehicle steering column under airbag inflation forces.

What is claimed is:

1. A vehicle airbag arrestor mountable about a vehicle steering column carrying a steering wheel with an inflatable airbag, the airbag arrestor comprising:
    an enclosure having a closed end wall, an opposed open end and a sidewall, the enclosure defining an interior cavity between the end wall and the open end adapted to be mountable over a vehicle steering wheel;
    an attachment member, mountable about the open end of the enclosure, to substantially, non-axially, movably mount the enclosure over a vehicle steering wheel;
    shape support means, coupled to the end wall, for maintaining the shape of the end wall, the shape support means including a shape support member coupled to the end wall; and
    the end wall including first and second spaced panels, the shape support member disposed between the spaced first and second panels.

2. The airbag arrestor of claim 1 further comprising:
    reinforcement means, coupled to the end wall, for reinforcing the end wall.

3. The airbag arrestor of claim 2 wherein the reinforcement means comprises:
    at least one strap coupled to the end wall.

4. The airbag arrestor of claim 2 wherein the reinforcement means comprises:
    a plurality of straps coupled to the end wall.

5. The airbag arrestor of claim 4 wherein:
    at least two of the reinforcement straps have overlapped portions.

6. The airbag arrestor of claim 1 wherein the attachment member comprises:
    a strap disposed about the open end of the sidewall of the enclosure, and a connector, coupled to the strap, for receiving a free end of the strap to releasably tighten the strap and the open end of the enclosure to a reduced diameter.

7. The airbag arrestor of claim 6 further comprising:
    the strap carried on the enclosure.

8. The airbag arrestor of claim 7 further comprising:
    the sidewall of the enclosure formed of a plurality of spaced flaps extending from one end coupled to the end wall to an opposed free end; and
    carrying means, formed on the free end of each flap, for receiving the strap therethrough.

9. The airbag arrestor of claim 8 wherein the carrying means comprises:
    a pocket on the free end of each flap.

10. The airbag arrestor of claim 1 wherein:
    the enclosure is formed of a flexible, ballistic material.

11. The airbag arrestor of claim 3 wherein:
    the enclosure is formed of KEVLAR.

12. The airbag arrestor of claim 3 wherein:
    the attachment member strap is formed of a flexible, ballistic grade NYLON.

13. The airbag arrestor of claim 7 further comprising:
    at least one aperture formed in the sidewall of the enclosure, the aperture communicating the interior cavity exteriorly of the enclosure.

14. The airbag arrestor of claim 1 wherein the at least one aperture further comprises:
    a plurality of apertures formed in the sidewall of the enclosure.

15. The airbag arrestor of claim 1 wherein the sidewall of the enclosure comprises:
    a plurality of flaps, each flap extending from the end wall to an opposed free end, each flap having opposed side edges, and
    at least a portion of the side edges of two adjacent flaps being spaced apart to define an aperture therebetween.

* * * * *